(12) United States Patent
Munoz

(10) Patent No.: US 9,444,737 B2
(45) Date of Patent: Sep. 13, 2016

(54) PACKET DATA PROCESSOR IN A COMMUNICATIONS PROCESSOR ARCHITECTURE

(71) Applicant: Intel Corporation, Santa Clara, CA (US)

(72) Inventor: Robert J. Munoz, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 13/756,849

(22) Filed: Feb. 1, 2013

(65) Prior Publication Data

US 2014/0153575 A1 Jun. 5, 2014

Related U.S. Application Data

(60) Provisional application No. 61/732,171, filed on Nov. 30, 2012.

(51) Int. Cl.
*H04L 12/747* (2013.01)
*H04L 12/741* (2013.01)

(52) U.S. Cl.
CPC ............ *H04L 45/742* (2013.01); *H04L 45/74* (2013.01)

(58) Field of Classification Search
USPC ....... 370/389, 392, 474, 355, 351, 428, 403, 370/400, 258, 412; 711/113, 118, 137, 213, 711/147
See application file for complete search history.

(56) References Cited

U.S. PATENT DOCUMENTS

| | | | |
|---|---|---|---|
| 7,512,740 B2 | 3/2009 | Diefendorff | |
| 8,140,759 B2 | 3/2012 | Frey et al. | |
| 2003/0058277 A1* | 3/2003 | Bowman-Amuah | G06F 17/30607 715/765 |
| 2004/0125750 A1* | 7/2004 | Katti | H04L 29/06 370/252 |
| 2006/0190688 A1* | 8/2006 | Van Eijndhoven et al. | 711/137 |
| 2008/0212586 A1* | 9/2008 | Wang | H04L 47/10 370/392 |
| 2009/0060197 A1* | 3/2009 | Taylor | H04L 9/0618 380/277 |
| 2011/0219195 A1 | 9/2011 | Habusha et al. | |
| 2011/0228674 A1* | 9/2011 | Pais et al. | 370/235 |
| 2011/0289179 A1* | 11/2011 | Pekcan | H04L 49/65 709/213 |
| 2012/0219002 A1* | 8/2012 | Sobaje | H04L 47/10 370/392 |
| 2012/0239652 A1* | 9/2012 | Wood | G06F 17/30598 707/737 |
| 2013/0246395 A1* | 9/2013 | Charlet et al. | 707/722 |

* cited by examiner

*Primary Examiner* — Habte Mered
*Assistant Examiner* — Rownak Islam
(74) *Attorney, Agent, or Firm* — Nicholson De Vos Webster & Elliott LLP

(57) ABSTRACT

Described embodiments provide a network processor having a hardware accelerator that identifies a received packet and, based on a flow identification associated with the received packet, might pre-fetch pre-established portions of data from the received packet into local data memory (e.g., local data cache) for processing by a general purpose processor core. In addition to the packet data, the software necessary for the general-purpose processor core to process the data might also be pre-fetched into local instruction memory (e.g., local instruction cache). The flow identification might be used to select different portions of the packet and different software to be pre-fetched.

16 Claims, 5 Drawing Sheets

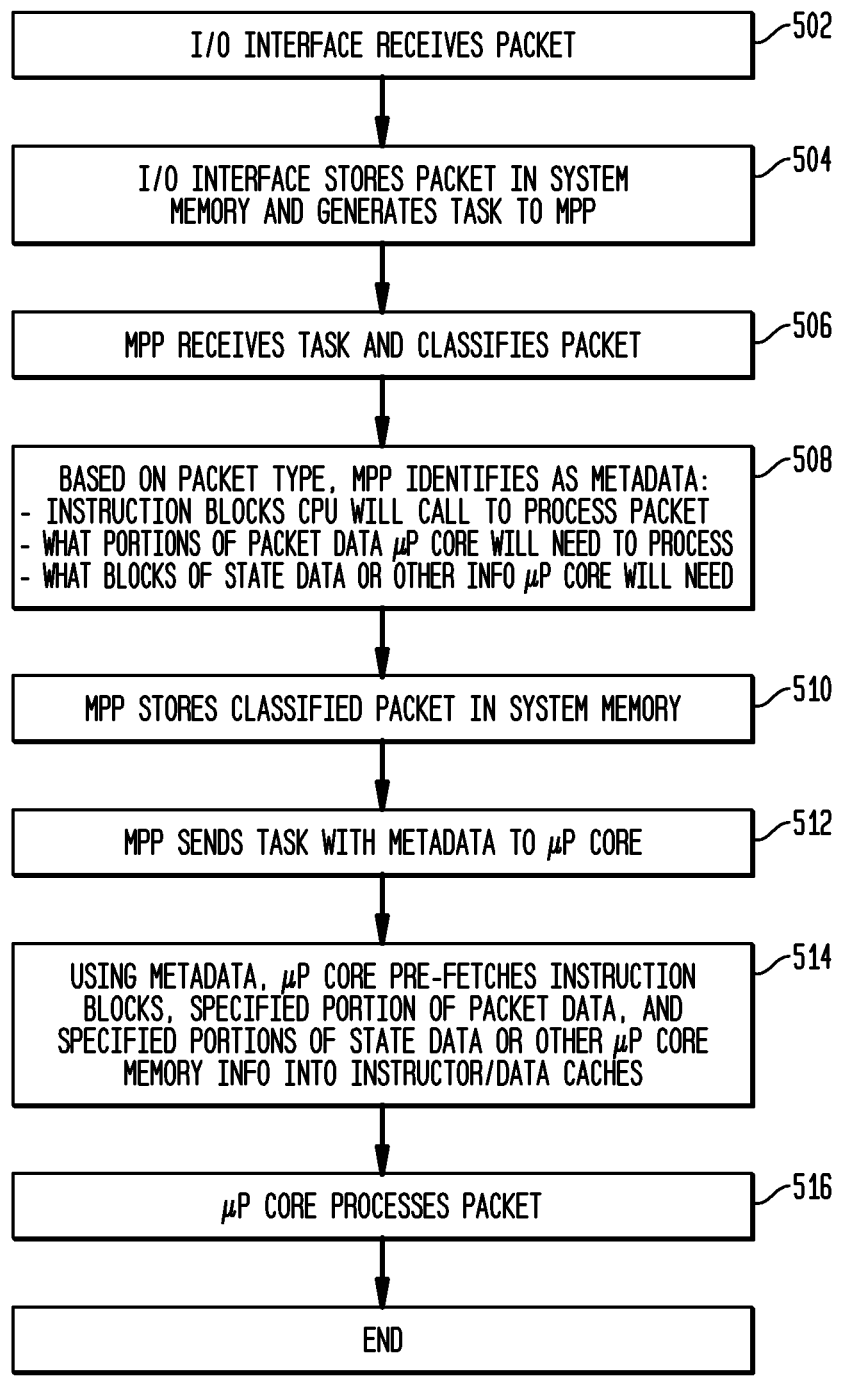

PACKET DATA PROCESSOR IN A COMMUNICATIONS PROCESSOR ARCHITECTURE

CROSS-REFERENCE TO RELATED APPLICATIONS

This application claims the benefit of the filing date of U.S. provisional application No. 61/732,171 filed 30 Nov. 2012, the teachings of which are incorporated herein by reference in their entirety.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,726 filed Mar. 12, 2011, Ser. No. 13/046,717 filed Mar. 12, 2011, Ser. No. 13/046,719 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,719, filed on Nov. 28, 2012, Ser. No. 13/687,772, filed on Nov. 28, 2012, Ser. No. 13/687,865, filed on Nov. 28, 2012, Ser. No. 13/687,911, filed on Nov. 28, 2012, and Ser. No. 13/687,971, filed on Nov. 28, 2012, the teachings of all of which are incorporated herein in their entireties by reference.

FIELD OF THE INVENTION

This invention relates to network processors generally and, more particularly, to packet processing accelerators.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like.

Network processors implemented as an SoC having multiple processing modules might typically employ one or more general-purpose processors and one or more hardware accelerators, the hardware accelerators implementing well defined procedures to improve the efficiency and performance of the SoC. However, the general-purpose processors might be required for certain packet processing functions, such as deep-packet inspection, that might not be efficiently implemented using the hardware accelerators alone. Further, overall throughput of the SoC might be limited where the processors "stall" waiting for packet data to be become available for processing when using memory, particularly memories external to the SoC, to communicate between the accelerators and the processors. For example, if a processor core tries to access memory addresses which are not in its cache and the memory system has to go to other memory (e.g., dynamic random access memory or "DRAM") to get them, it can cause the processor core to stall for hundreds of processor clock cycles per address to wait for the memory system to deliver the requested data to processor core. In another example, an external memory might include two or more substructures (e.g., multiple banks of DRAM). In such a system, a latency penalty might be incurred for multiple access requests to the same memory substructure. Additionally, a given set of operations for a data flow might be required to be completed in a given order, further adding to latency. Thus, a technique for reducing latency when accessing memory is desirable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a network processor comprising a shared memory, an input/output module configured to receive a packet and store the received packet in the shared memory, a packet processing module, and a processor core module having a local memory. The packet processing module is configured to classify the received packet stored in the shared memory, identify which one of one or more of a known flow the received packet pertains, retrieve structural metadata corresponding to the identified flow of the received packet, and pass to the processor core module the structural metadata. The processor core module is configured to pre-fetch content at address locations in the shared memory specified by the structural metadata, store the pre-fetched content into the local memory, and process the pre-fetched content stored in the local memory.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

FIG. 5 illustrates an exemplary process for processing a received packet in accordance with one embodiment of the invention.

DETAILED DESCRIPTION

Figure 1:
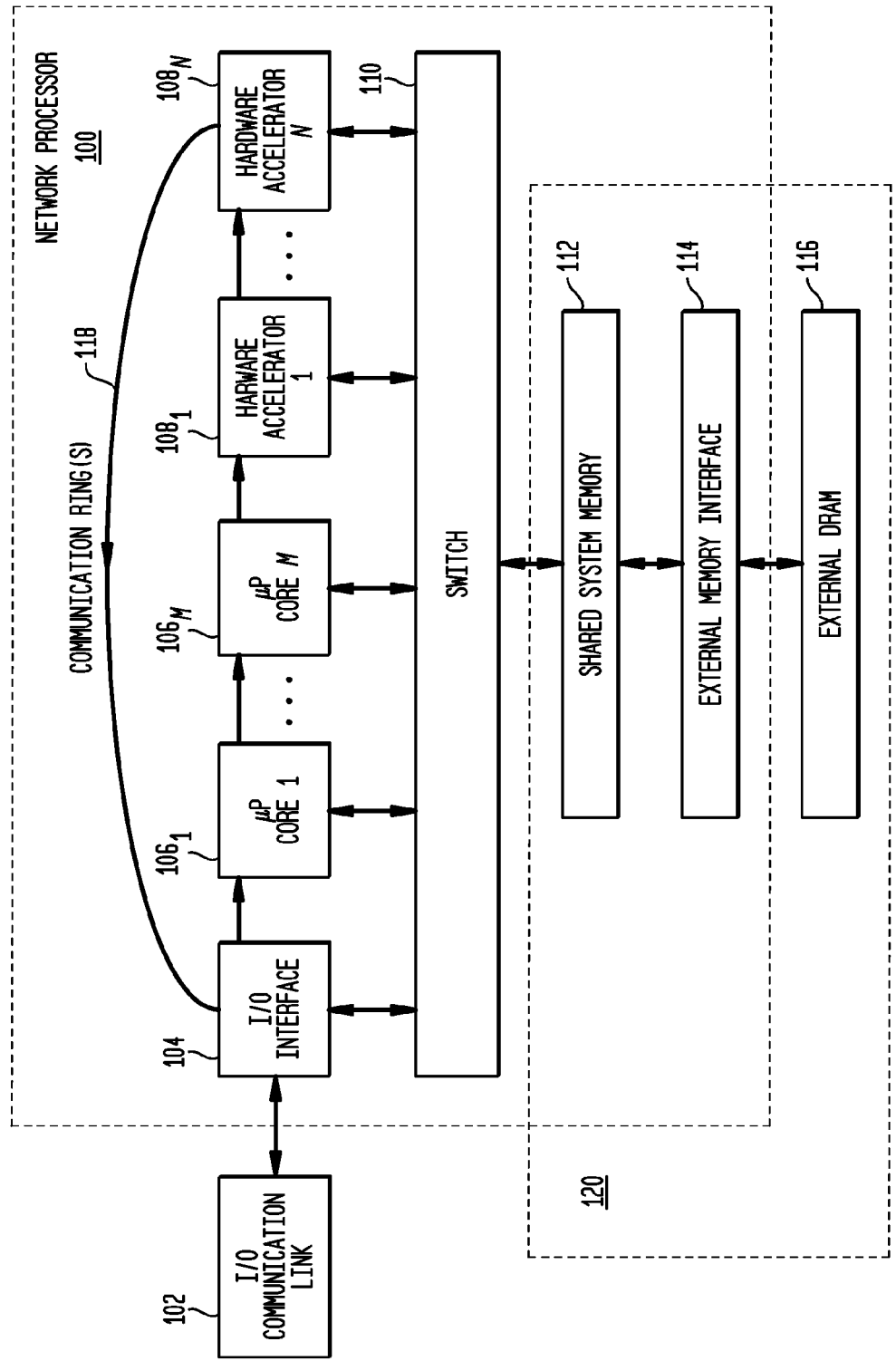
FIG. 1 shows a block diagram of a network processor operating in accordance with exemplary embodiments.

Reference herein to "one embodiment" or "an embodiment" in this Detailed Description means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple", "coupling", "coupled", "connect", "connecting", or "connected" refer to any manner known in the art or later developed in which energy is allowed to transfer between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise. Further, elements in a figure having subscripted reference numbers (e.g., $100_1$, $100_2$, ... $100_K$) might be collectively referred to herein using the reference number 100.

Table 1 defines a list of acronyms employed throughout this specification as an aid to understanding the described embodiments:

TABLE 1

| | |
|---|---|
| USB | Universal Serial Bus |
| SATA | Serial Advanced Technology Attachment |
| SCSI | Small Computer System Interface |
| SAS | Serial Attached SCSI |
| PCI-E | Peripheral Component Interconnect Express |
| SoC | System-on-Chip |
| AXI | Advanced eXtensible Interface |
| AMBA | Advanced Microcontroller Bus Architecture |
| PAB | Packet Assembly Block |
| MTM | Modular Traffic Manager |
| HE | Hash Engine |
| SENG | State Engine |
| SCH | Scheduler |
| SPP | Security Protocol Processor |
| TID | Task Identifier |
| TCP | Transmission Control Protocol |

TABLE 1-continued

| | |
|---|---|
| CPU | Central Processing Unit (Processor Core) |
| FIFO | First-In, First-Out |
| I/O | Input/Output |
| DDR | Double Data Rate |
| DRAM | Dynamic Random Access Memory |
| MMB | Memory Manager Block |
| µP | Microprocessor |
| PLB | Processor Local Bus |
| MPP | Modular Packet Processor |
| SED | Stream Editor |
| PQM | Pre-Queue Modifier |
| FBI | Function Bus Interface |
| SEM | Semaphore Engine |
| PDU | Protocol Data Unit |
| PIC | Packet Integrity Checker |
| CRC | Cyclic Redundancy Check |
| IP | Internet Protocol |
| 3GPP | $3^{rd}$ Generation Partnership Project mobile communication standard |

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (g) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, processor cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through 110 communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In described embodiments, shared memory 112 is a conventional memory operating as a cache that might be allocated and/or subdivided. For example, shared memory 112 might include one or more FIFO queues that might be dynamically allocated to the various processor (µP or CPU) cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In some embodiments, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various processor cores 106 and hardware accelerators 108 of network processor 100 might include several exemplary types of processors or accelerators. For example, the various processor cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy and operates substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing, standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in system memory 120. Memory is allocated for such applications as task FIFO storage, packet data storage, hash-table collision handling, timer event management, and traffic manager queues. The MMB provides reference counts to each block of a memory within system memory 120. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in system memory 120 might be dynamically allocated by the MMB to store data. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities and operates substantially as described in related U.S. patent application Ser. No. 12/971,742 filed Dec. 17, 2010, and Ser. No. 13/405,053 filed Feb. 23, 2012, the teachings of which are incorporated by reference herein.

As will be described in more detail in connection with FIG. 4, the MPP is a multi-threaded special purpose processor that provides tree based longest prefix and access control list classification. The MPP also has a hardware hash-based classification capability with full hardware management of hash-table additions, deletions, and collisions. The MPP contains a statistics and state management engine, which when combined with the hash table and timer facilities, provides support for state-based protocol processing. The MPP might support millions of flows, each flow having a flow identifier or flow ID, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
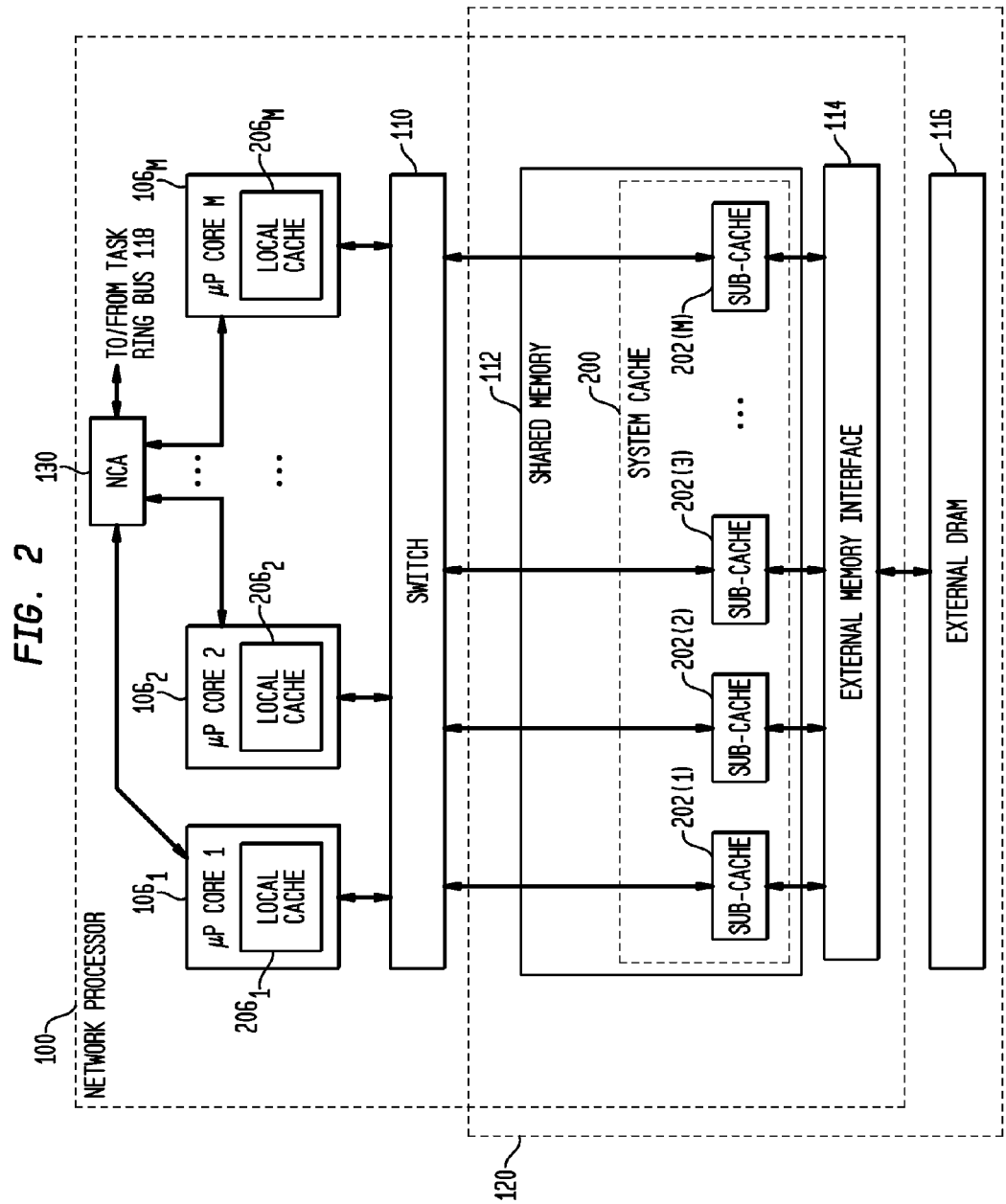
FIG. 2 shows a block diagram of a system cache of the network processor of FIG. 1.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more sub-caches, shown as sub-caches 202(1)-202(N). The sub-caches 202 might be employed to cache data from any processor core or accelerator (e.g., processor cores 106 or accelerators 108) of network processor 100. As indicated by dashed line 120, shared memory 112 and external memory 116 is referred to as system memory 120.

As described in related U.S. patent application Ser. Nos. 12/782,379, 12/782,393, and 12/782,411, which are incorporated by reference herein, the sub-caches 202 might be addressed is switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 202(1)-202(N) might form a memory array, and the number of system caches might preferably be implemented as a power of two. One or more memory blocks might be allocated to each sub-cache 202(1)-202(N). In embodiments of the present invention, each sub-cache 202(1)-202(N) might be implemented as an N-way associative cache employing a least recently used (LRU) caching algorithm. Details on the sub-caches 202 are described in the above-referenced U.S. patent application Ser. No. 13/192,104 and incorporated by reference herein in its entirety.

As shown in FIG. 2, one or more of the processor core modules $106_1$-$106_M$ (M<N) has at least a corresponding local level one (L1) cache, shown as local caches $206_1$-$206_M$. Depending on the design of the processor cores 106, in one embodiment the caches 206 might also include a level two (L2) cache. In still another embodiment, an L2 cache is shared between multiple processor cores 106, for example four processor cores. The function of local caches $206_1$-$206_M$ is to act as an interface to the system cache 200 for the µP core modules $106_1$-$106_M$ of network processor 100. Local caches $206_1$-$206_M$ might be referred to as "pipeline" caches, since local caches $206_1$-$206_M$ are typically employed only for certain ones of the µP core modules $106_1$-$106_M$ that the system cache 200 accesses as part of an execution pipeline.

The local caches $206_1$-$206_M$ might be configured to have a data portion and an instruction portion (not shown) to reduce bottlenecks between corresponding µP core modules and the local caches, thereby increasing the processing speed of the µP core modules.

A network CPU adapter (NCA) 130 serves as an interface between the task ring bus 118 and the processor cores 106. Communication between the processor cores 106 and the NCA 130 is based on classic producer-consumer queues (not shown). Generally, these queues store tasks by the various processor cores 106 and the NCA 130 passes the stored tasks to the target hardware accelerator 108 or I/O interfaces 104. Similarly, the NCA 130 receives and stores tasks from the accelerators and interfaces and passes them to the processor cores. More detail on the operation of the NCA 130 is described in the above-referenced patent application Ser. No. 13/192,140.

Figure 3:
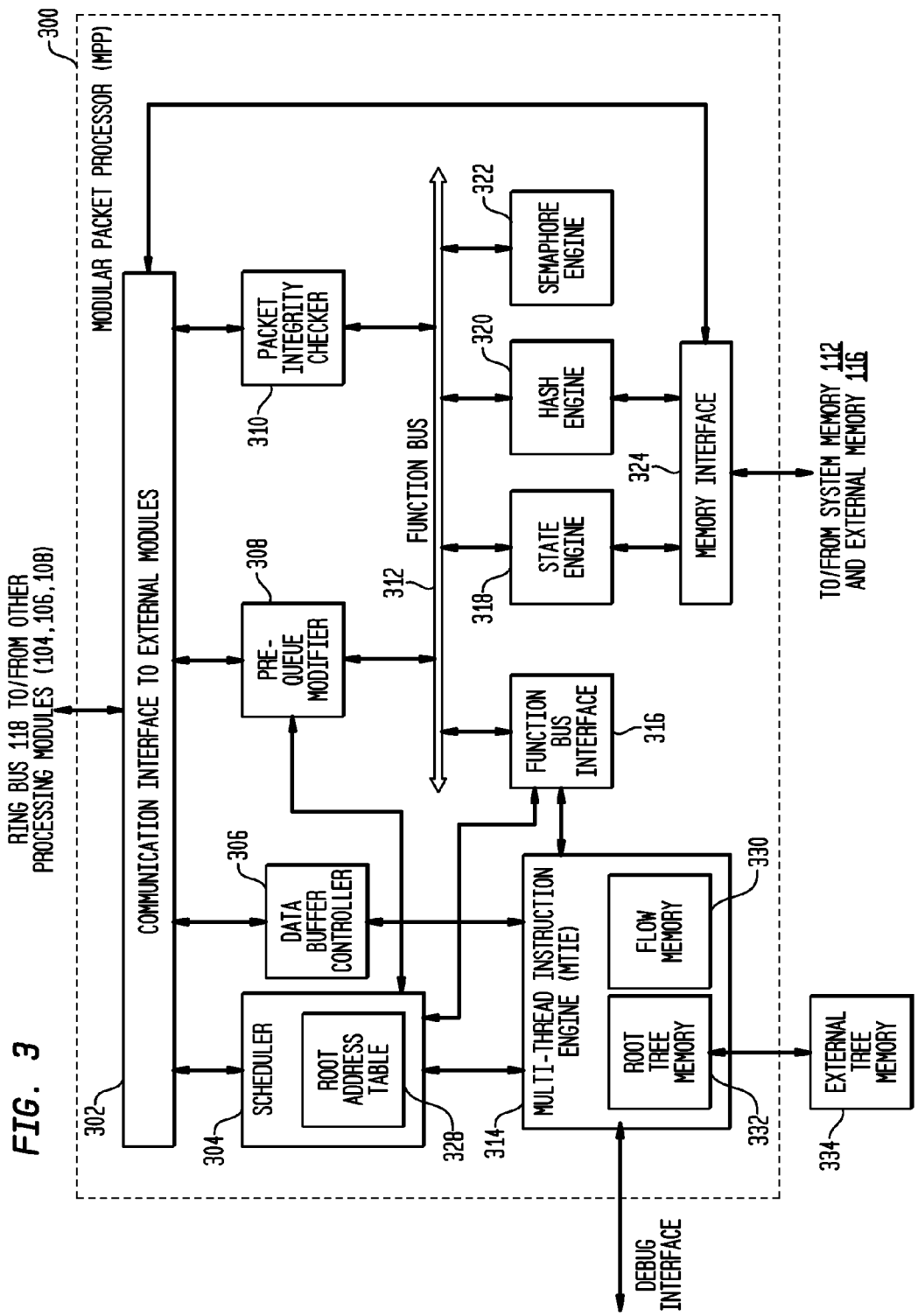
FIG. 3 shows a block diagram of a modular packet processor sub-module of the network processor of FIG. 1 in accordance with exemplary embodiments.

FIG. 3 shows a block diagram of an exemplary MPP 300, in accordance with described embodiments. MPP 300 receives, via task ring bus 118, an input task identified by a virtual flow identifier (flow ID) from any µP core 106, I/O interface 104, or accelerator 108 of network processor 100. MPP 300 performs operations specified by the input task on a data packet stored in at least one of shared memory 112 and external memory 116. When MPP 300 is finished operating on the data packet, MPP 300 might generate an output task, with a flow ID matching the input task flow ID, to another processor core or accelerator of network processor 100, for example, a next processor core or accelerator specified for a given flow ID.

As described herein, MPP 300 is generally employed as a packet classification engine in network processor 100. In general, packet classification categorizes packets into classes, for example, based on port number or protocol. Each resulting packet class might be treated differently to control packet flow. For example, each packet class might be subject to a different rate limit or prioritized differently relative to other packet classes. Classification is achieved by various means, such as by port number. Matching bit patterns of data to those of known protocols is another simple, yet widely used technique for packet classification. More advanced traffic classification techniques rely on statistical analysis of attributes such as byte frequencies, packet sizes and packet inter-arrival times. Upon classifying a traffic flow using a particular protocol, the MPP assigns a flow identification or flow ID to the flow. A predetermined policy can be applied to the classified traffic flow and other flows based on the flow ID, to either guarantee a certain quality (as with VoIP or media streaming service) or to provide best-effort delivery, for example.

As shown in FIG. 3 and as will be described, packet classification is performed by Multi-thread Instruction Engine (MTIE) 314 of MPP 300. For purposes here, software running on the MPP controls how the MTIE steps through the packet a field at a time and classify it to ultimately generate an application-specific flow ID based on looking at the fields in the packet, fields in the task metadata that came in with the packet (e.g., port number that the packet came in on), results of hash, policing, statistics, or state engine script calls, etc. Packet (also Protocol Data Unit or PDU) data modification might be carried out by Pre-Queue Modifier (PQM) 308. A packet integrity check might typically be carried out by Packet Integrity Checker (PIC) 310, such as determining that a packet is properly formed according to a given protocol. PIC 310 might, for example, implement various CRC and checksum functions of MPP 300. Interface to communication interface 302 provides a standard interface between MPP 300 and chip level connections to external modules of network processor 100, for example by one or more ring communication buses 118. Semaphore Engine (SEM) 322 implements semaphore logic in MPP 300 to manage atomic access to a hardware resource of network processor 100 and MPP 300. For example, for a context thread to utilize an instance of a hardware resource, the context thread might have to reserve a semaphore for that resource. Hash table operations might be carried out by Hash Engine (HE) 320. HE 320 implements hash engine functionality in MPP 300. HE 320 receives instructions from Function Bus Interface (FBI) 316 over function bus 312. State Engine (SENG) 318 performs the functions of a finite state machine (FSM) that operates on received packets. For example, SENG 318 might perform statistics counts and run traffic shaper scripts.

MPP 300 is generally implemented as a multi-threaded engine capable of executing parallel functions. The multi-threading operation is performed by multiple contexts in MTIE 314. Some embodiments of MPP 300 might employ more than one MTIE 314 to support additional context processing. For example, MPP 300 might preferably include four MTIE cores, each capable of processing 32 contexts, for a total of 128 contexts. These contexts might be supported by 256 task identifiers (TIDs), meaning that contexts for up to 256 tasks might be concurrently active in MPP 300. Details on embodiments of thread operation is described in U.S. patent application Ser. No. 12/974,477 filed on Dec. 21, 2010, and U.S. Published Patent Application, 2011/0225588, both of which are incorporated by reference herein in their entirety.

Briefly, scheduler (SCH) 304 tracks MPP contexts and maintains a list of free contexts. Upon receiving a task start request, if a free context is available, SCH 304 issues a context start indication to one or more other modules of MPP 300 such that the various modules, if necessary, might initialize themselves to process the context. SCH 304 also maintains task template to root address table 328. Root address table 328 has therein a configuration table that specifies the instruction entry point (e.g., the address of first instruction in flow memory 330) and various task parameters for a given task. Root address table 328 might typically be loaded on initial configuration of MPP 300 and might be dynamically modified by a processor core. Details of the configuration table in accordance with an embodiment of the invention is described in connection with FIG. 4.

Upon receiving the context start indication from SCH 304, MTIE 314 initializes its internal context memory and loads the task parameters of the received task. MTIE 314 also loads the root address to use for the context from root address table 328, such that MTIE 314 can determine what processing to perform for the received input task. Upon receiving the context start indication from SCH 304, Data Buffer Controller 306 initiates a data read operation to read the packet data corresponding to the context from at least one of system memory 112 and external memory 116. HE 320, FBI 316 and PIC 310 reset various valid bits for error detection for the context.

After the context start indication is issued, SCH 394 issues a context schedule indication to MTIE 314. In response to the context schedule indication, MTIE 314 starts executing a first command stored at the location specified in root address table 328. The command might be stored in at least one of root tree memory 332, flow memory 330, and external tree memory 334. While executing the specified commands, MTIE 314 fetches tree instructions from either root tree memory 332 or external tree memory 334. MTIE 314 also fetches flow instructions from flow memory 330. Some embodiments might include a flow memory for each MTIE core of MPP 300, and some embodiments might further allow the flow memory for multiple MTIE cores to be shared to increase the size of the flow memory for all MTIE cores.

Once an MTIE core has characterized a particular packet and if there is a flow ID associated with it, the MTIE 314 determines how the received packet is to be processed, i.e., whether further processing by a processor core is needed. If no flow ID is associated with the packet, the MPP assigns a new flow ID and the packet is processed in accordance with default processing parameters specified by a default configuration table. Alternatively, it is possible to create a new flow ID for the packet in some types of applications, e.g., using the HE 320 to add an entry for the new flow ID in the aforementioned hash table.

During operation of the network processor 100, software executed by the μP cores 106 allocates a set of memory buffers (not shown) in the system memory 120 to be used for storing received packets. The addresses of the buffers are known to both the processor cores and the NCA 130 and might be organized by queue ID i.e., packet data is passed back and forth in the buffers based on the queue ID of the virtual pipeline the packet belongs to using producer-consumer control queues in the system memory 120. Typically, there is an association that the MPP 300 would have that maps the flow ID, as determined by the MPP 300, to the queue ID in the NCA 130 that packets of that flow ID should be sent to. In this case, the MPP 300 supplies the queue ID to be used in the task parameters in the tasks (discussed below in connection with FIG. 4) it sends to the NCA 130 and the NCA would be configured to look at and use this queue ID. Also, for task communication using the NCA 130, descriptor information is carried inside the messages placed in the producer-consumer queues. In other implementations this communication might be done via descriptor chains in the shared memory 120. Based on the queue ID of the task from the MPP stored in the NCA, the NCA knows what address the buffers are located in the system memory 120. The NCA 130 uses the descriptors or producer consumer queues to send and receive messages between the processor cores and itself. These descriptors are also used for logically passing "ownership" of these buffers between hardware accelerators 108 (e.g., MPP 300) and the NCA 130.

Here the MPP 300 deposits incoming packets for the processor cores into these buffers and through the NCA 130, updates the descriptors to say which buffers are now owned by which one of the processor cores. After the assigned processor core processes the packet data in these buffers, it updates, through the NCA 130, the descriptors to reflect that the MPP or another one of the processor cores, hardware accelerators, or ISO interface "owns" the associated buffers.

Alternatively, descriptor chains might be used to pass descriptors and information between accelerators 108, processor cores 106, and interface 104.

While packet classification by the MPP 300 provides accelerated processing of packets, there are packet types that require a processor (μP) core 106 to process, such as inspecting data in 3GPP radio packets and conveying the data into a packet type for transmission to a mobile handset. However, while processor cores are relatively fast, getting packet data to the processor for processing might be a limiting factor for fast packet processing by a processor core. Because the processor cores 106 and hardware accelerators 108, such as the MPP 300, use the shared memory 112 and, if needed, the external memory 116 (FIG. 1) in system memory 120 to pass information back and forth between them, a processor generally waits or "stalls" until all the data is loaded into its data memory before processing of the data begins. For example, for processor core 106₁ is to process packet data from the MPP as hardware accelerator 108₁, the processor fetches the necessary packet data from the memory 120 and stores same in the data portion of its local memory. This movement of data can be inefficient especially where large amounts of data must be moved by the processor core before it can process the data.

To address this issue, the processor cores 106 are configured to allow the prefetching of packet data from the system memory 120 to the local memory (e.g., the local cache 206₁) of a processor core prior to the processor core begins processing the packet data. Conventional processor-specific cache pre-fetch instructions (e.g., a PLD instruction for the ARM processor cores) might be used to load the local cache associated with the processor core with the required packet data, and, if desired, state data and processor software necessary for the processor core to process the packet data. For the processor core to efficiently load the data, pointers, and other information (referred to herein as structural metadata or simply metadata) pertaining, to the packet and the processing of the packet by the processor core (or a pointer to the metadata) is passed to the processor core either separately via task ring 118, in the task data stored in the task queues, or part of the packet data stored in the system memory 120.

More specifically, to accelerate processing of packet data by one or more of the processor cores 106, one or more of the MTIE 314 in the MPP 300 is configured by software running in one or more processor cores 106 to provide structural metadata related to at least a portion of a received packet stored in the buffers in the system memory 120 to a processor core 106 based on the flow ID of a received packet. In one embodiment, one or more configuration tables in an MTIE 314 might be configured to specify to the software executed by a processor core 106 what regions of memory need to be loaded into the local cache associated with the processor core, thereby reducing processing latency. The processor software might also configure the configuration tables in the MTIE 314 to provide structural metadata on what these memory regions are for (e.g., as part of setting up a datagram connection or dynamically as part of processing earlier packets of the corresponding flow and learning what regions of memory are important to load into the cache). The processor software might also configure the configuration tables in the MTIE 314 to provide structural metadata on what portions of the packet (e.g., the first K bytes of the header) are important to load into the processor core's local cache. The MPP then provides the metadata back to the processor core as packet metadata stored with the associated packet data in the system memory 120 or as part of the task sent by the MPP to the processor core. The processor core processing the packets uses this metadata to initiate processor-dependent cache pre-fetch instructions to pre-fetch the data or software that were previously identified to reduce memory latency and thereby improve performance. Therefore, the memory addresses that the processor cores will be accessing when processing packets will already be in the processor's caches before the processor software accesses them.

Figure 4:
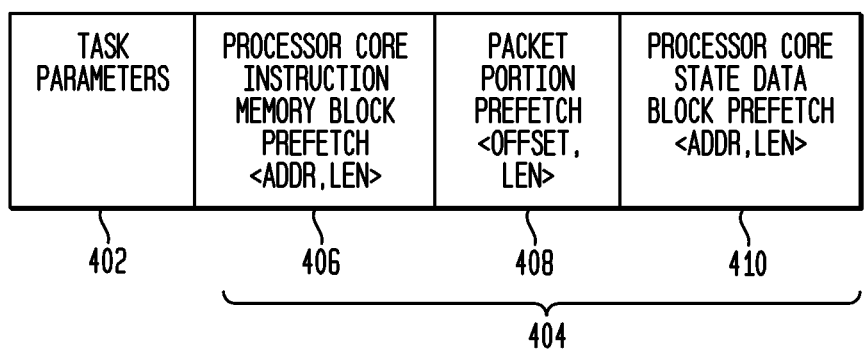
FIG. 4 illustrates an exemplary configuration table used in the modular packet processor of FIG. 3.

As illustrated in FIG. 4 and in accordance with one embodiment of the invention, a configuration table 400 has a task parameter portion 402 and a metadata portion 404. Examples of the structural metadata identifying, what is to be pre-fetched might include:

The regions of instruction memory in the processor core's local cache that should be preloaded. For example, this might be specified as a set of <instruction memory address, length> two-tuples 406. This set of metadata is optional.

The portions of a received packet to be preloaded into the data memory of the processor core's local cache, e.g., 206₁. For example, this might be specified as a set of <offset from packet header, data length> two-tuples 408. By knowing, the starting address of the buffer storing the packet data in the system memory 120, the processor core software calculates the beginning address of, or pointer to, the packet data in the system memory 120 to be pre-fetched.

The regions of data memory that are to be preloaded with data related to the logical state of the corresponding flow (e.g., source and destination IP addresses, source and destination TCP port, information on the current send and receive windows, etc.) and other needed data from the system memory 120. For example, this might be specified as a set of <data memory address, length> two-tuples 410. This set of metadata is also optional.

The task parameter portion 402 contains information that the processor cores 106 need to correctly know how to functionally process the packet it is receiving. This might include the flow ID or other results from the classification step (so that the receiving processor core doesn't have to redo the classification processing itself) or any other data needed to process the packet (e.g., the timestamp that was assigned to the packet when it came in from an Ethernet interface).

Generally, the configuration tables 400 are organized by flow ID. The MPP uses the identified flow ID of a received packet to determine which one or ones of the configuration tables are used by the MTIE 314 when processing packets associated with a particular flow. It is understood that other metadata might be sent in addition to that described above.

FIG. 5 shows a flow diagram 500 of an exemplary operation of the network processor 100 in accordance with an embodiment of the invention is as follows. Starting with step 502, a packet from communication link 102 is received by I/O interface 104 which determines if the packet needs to be processed by one or more of the processor cores 106 and accelerator cores 108, such as the MPP 300. Assuming that the MPP 300 is to process the received packet, in step 504 the I/O interface stores the packet in the shared system memory 120. Then the I/O interface generates a task and places the task marked for the MPP 300 on the communication ring bus 118, thereby informing the MPP that a packet is available for it to process and passes "ownership" of the packet to the MPP. Next, in step 506 the MTIE 314 in the MIT 300 analyzes the packet stored in the memory 120 to classify it using one or more of the classification techniques described above to identify which flow, if any, the packet belongs. Based on the packet flow, the packet might be sent to one of the processor cores 106 for further processing. If the processor core has previously provisioned the configuration table for that flow with "instructions" commanding the MTIE 314 to send metadata such as that shown in FIG. 4 to the processor core, then the MPP 300 identifies the relevant metadata in step 508, and stores the classified packet in the system memory in step 510. Then the MPP in step 512 sends a task message over the ring bus 118 containing the metadata and additional data regarding the locations in the shared memory 120 where the packet data can be found and ownership of the data is passed to the processor core. Next, in step 514 the processor core receives the task and uses the metadata to pre-fetch the packet data, state data, and the optional software into the processor core's local cache for the processor core to process in step 516. It is understood that some of the steps can be reordered or deleted as required.

In an alternative embodiment, some of the prefetching (e.g., instructions, some packet and state data) is interleaved with the other prefetching (e.g., remaining packet and state data) during packet processing, to take advantage of the processor core's ability to issue and complete multiple instructions per cycle. This could be conveyed as part of the pre-fetch information that the processor core provisions the configuration tables in the MPP with.

While the exemplary embodiments have been described with respect to processing blocks in a system having one or more software programs, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field, variations in a magnetic recording medium, etc., generated using a method and/or an apparatus of described embodiments.

It will be further understood that various changes in the details, materials, and arrangements of the parts that have been described and illustrated in order to explain the nature of described embodiments might be made by those skilled in the art without departing from the scope of the following claims.

The invention claimed is:

1. A network processor comprising:
a shared memory;
an input/output module arranged on a ring bus to communicate tasks from a source to a destination on the ring bus, the input/output module to receive a packet and store the received packet in the shared memory;
a packet processing module arranged on the ring bus; and
a processor core arranged on the ring bus and having a local memory;
wherein the packet processing module to:
classify the received packet stored in the shared memory,
identify which flow of one or more of known flows the received packet pertains to,
retrieve structural metadata corresponding to the identified flow of the received packet, and pass the structural metadata to the processor core, wherein the structural metadata is retrieved from at least one configuration table corresponding to the identified flow out of a plurality of configuration tables, and includes one of at least an offset and length of the received packet for determining what addresses in the shared memory are to be pre-fetched to obtain the portion of packet data of the received packet and an identifying address and length of the software instructions in the shared memory to be pre-fetched; and
wherein the processor core to:
pre-fetch content at address locations in the shared memory specified by the structural metadata,
store the pre-fetched content into the local memory, and process the pre-fetched content stored in the local memory,
wherein the pre-fetched content comprises (i) at least a portion of packet data of the received packet, and (ii) software instructions corresponding to the identified flow, which are used to process the packet data.

2. The network processor of claim 1 wherein the local memory has a data portion and an instruction portion, wherein the pre-fetched packet data is stored in the data portion of the local memory, and wherein the pre-fetched software instructions are stored in the instruction portion of the local memory.

3. The network processor of claim 1 wherein when the packet processing module identifies which flow the received packet pertains to, the packet processing module returns a flow identifier associated with the identified flow, and the structural metadata is retrieved by the packet processing module using the flow identifier to identify the retrieved structural metadata.

4. The network processor of claim 3 wherein the structural metadata is stored in the shared system memory.

5. The network processor of claim 1 wherein the packet processing module classifies the stored packet by port number, matching bit patterns of the stored packet to patterns of known protocols, frequency analysis of bytes in the stored packet statistical analysis of packet sizes, statistical analysis of packet inter-arrival times, or a combination thereof.

6. The network processor of claim 1 wherein if the packet processing module is unable to classify the stored packet as pertaining to one of the known flows, then the packet processing module assigns a new flow to the received packet and a default set of structural metadata is passed to the processor core module.

7. The network processor of claim 1 wherein the configuration table is stored in the packet processing module.

8. The network processor of claim 1 wherein the local memory includes a cache memory.

9. The network processor of claim 1 wherein the network processor is implemented in an integrated circuit.

10. A method of processing one or more packets received by a network processor having at least one shared system memory, the method comprising:
   receiving a packet by an input/output module which is arranged on a ring bus that communicates tasks from a source to a destination on the ring bus;
   storing, by the input/output module and a switch, the received packet in the shared system memory;
   pre-programming, by the processor core module, one or more configuration tables to include structural metadata corresponding to one or more known flows;
   classifying, by a packet processing module, the received packet stored in the shared system memory, to identify which flow of the one or more known flows the received packet pertains to;
   retrieving, by the packet processing module, structural metadata corresponding to the identified flow of the received packet, wherein the structural metadata is retrieved from at least one configuration table of the one or more configuration tables, which corresponds to the identified flow, and includes one of at least an offset and length of the received packet for determining what addresses in the shared memory are to be pre-fetched to obtain the portion of packet data of the received packet and an identifying address and length of the software instructions in the shared memory to be pre-fetched;
   passing, to a processor core module using the ring bus, the structural metadata;
   prefetching, by the processor core module, content at addresses in the shared memory specified by the structural metadata; and
   storing the pre-fetched content into a memory local to the processor core module, wherein the pre-fetched content comprises (i) at least a portion of packet data of the received packet, and (ii) software instructions corresponding to the identified flow, which are used to process the packet data.

11. The method of claim 10 wherein the step of classifying is performed by port number, matching bit patterns of the stored packet to patterns of known protocols, frequency analysis of bytes in the stored packet, statistical analysis of packet sizes, statistical analysis of packet inter-arrival times, or a combination thereof.

12. The method of claim 10 wherein if the packet processing module is unable to classify the received packet as pertaining to one of the known flows, then the packet processing module assigns a new flow to the received packet and a default set of structural metadata is passed to the processor core module.

13. The method of claim 10 wherein in the classifying step, the packet processing module returns a flow identifier associated with the identified flow, and wherein the structural metadata is retrieved using the flow identifier to identify the retrieved structural metadata.

14. The method of claim 10 further comprising the step of: processing, by the processor core module using the pre-fetched software instructions in the local memory, the pre-fetched data stored in the local memory.

15. The method of claim 14 wherein the local memory has a data portion and an instruction portion, the pre-fetched packet data is stored in the data portion of the local memory, and the pre-fetched software instructions are stored in the instruction portion of the local memory.

16. The method of claim 10 wherein the local memory includes a cache memory.

* * * * *